(12) United States Patent
Ikeda et al.

(10) Patent No.: US 7,911,776 B2
(45) Date of Patent: Mar. 22, 2011

(54) DISK DEVICE

(75) Inventors: Shouji Ikeda, Okazaki (JP); Eiichi Takei, Okazaki (JP); Ryousuke Morimoto, Yokohama (JP)

(73) Assignee: Aisin AW Co., Ltd. (JP)

( * ) Notice: Subject to any disclaimer, the term of this patent is extended or adjusted under 35 U.S.C. 154(b) by 257 days.

(21) Appl. No.: 12/230,827

(22) Filed: Sep. 5, 2008

(65) Prior Publication Data

US 2009/0073649 A1 Mar. 19, 2009

(30) Foreign Application Priority Data

Sep. 10, 2007 (JP) ................................. 2007-233996

(51) Int. Cl.
*G06F 1/16* (2006.01)

(52) U.S. Cl. ................................. 361/679.33

(58) Field of Classification Search ............. 361/679.33, 361/679.35
See application file for complete search history.

(56) References Cited

U.S. PATENT DOCUMENTS

| | | | | |
|---|---|---|---|---|
| 4,417,289 A * | 11/1983 | Ragle et al. | ................ | 360/98.03 |
| 6,160,703 A | 12/2000 | Lopez | ........................... | 361/685 |
| 6,469,890 B1 * | 10/2002 | Gan | ........................ | 361/679.35 |
| 6,775,132 B2 * | 8/2004 | Chen et al. | ................ | 361/679.33 |
| 6,798,652 B2 * | 9/2004 | Wang et al. | ............... | 361/679.33 |
| 7,031,150 B2 * | 4/2006 | Chen et al. | ................ | 361/679.33 |
| 7,558,058 B2 | 7/2009 | Hidaka | ........................ | 361/685 |
| 7,593,221 B2 * | 9/2009 | Sheng | ...................... | 361/679.35 |
| 7,701,702 B2 * | 4/2010 | Chen et al. | ................ | 361/679.33 |
| 2001/0018792 A1 * | 9/2001 | Miyahara | ........................ | 29/557 |
| 2002/0148273 A1 * | 10/2002 | McKinney et al. | .......... | 72/379.2 |
| 2003/0002205 A1 * | 1/2003 | Shibata et al. | ............. | 360/97.01 |
| 2007/0263351 A1 * | 11/2007 | Ho et al. | ....................... | 361/685 |
| 2009/0168325 A1 * | 7/2009 | Yeh et al. | ................. | 361/679.33 |

FOREIGN PATENT DOCUMENTS

| | | |
|---|---|---|
| JP | 3123943 | 10/2000 |
| JP | 2002-032979 | 1/2002 |
| JP | 2005-135564 | 5/2005 |
| JP | 2006-228331 | 8/2006 |
| JP | 2007-141388 | 6/2007 |

* cited by examiner

*Primary Examiner* — Lisa Lea-Edmonds
(74) *Attorney, Agent, or Firm* — Bacon & Thomas, PLLC

(57) ABSTRACT

A disk device includes a disk unit housing a disk-shaped storage medium, a case holding the disk unit, a bracket holding the case, and a guide member guiding sliding movement of the case in and out from the bracket. The disk device also includes spring members on one of the bracket and the case, distributed in the direction of the relative movement. Each of the spring members extends longitudinally in the direction of the movement. Distal ends of the spring members face and press against the other of the bracket and the case. Base portions of the spring members are integral with the one of the bracket and the case. The spring members inhibit lateral vibration of the case by pressing against small projections on the case. Other spring members inhibit vertical vibration of the case by pressing against sliding support rails of the case. A face plate of the case absorbs vibration in the longitudinal direction.

17 Claims, 4 Drawing Sheets

DISK DEVICE

INCORPORATION BY REFERENCE

The disclosure of Japanese Patent Application No. 2007-233996 filed on Sep. 10, 2007, including the specification, drawings and abstract is incorporated herein by reference in its entirety.

BACKGROUND OF THE INVENTION

1. Field of the Invention

The present invention relates to a disk device that incorporates an information storage medium and, more particularly, relates to a structure that prevents or minimizes vibration of a disk unit housed therein.

2. Description of the Related Art

Japanese Patent Application Publication No. JP-A-2005-135564 discloses a disk unit that is inserted into a receiving slot of an electronic device. The disk unit includes a hard disk, a drive motor, a read/write head, and a head actuator. The disk unit is inserted into a bottom cover of the electronic device. A control circuit board is mounted on top of the disk unit, and a top cover is placed over the disk unit and joined to the bottom cover. Windows are provided in the top cover, through which connector terminals on the control circuit board are exposed. Connector conductors in the electronic device make contact with the connector terminals on the control circuit board through the windows.

In Japanese Patent Application Publication No. JP-A-2007-141388, a hard disk drive (HDD) device is described in which a vibration absorbing cushion made of a rubber material is inserted between a support bracket and a support plate to which an HDD unit is fastened. A hook on the support plate is inserted into and engaged with a latch hole in the support bracket to fasten the HDD unit to the support bracket.

Japanese Patent 3122943 discloses a floppy disk device in which a loading mechanism, that includes a cassette holder and a slide member, is held by a bottom case that has threaded holes, for mounting, in a bottom face and in two side faces. Strain propagation is inhibited by mounting a head positioning mechanism and a disk drive mechanism as separate pieces on a substrate. The bottom case is described as preventing noise and penetration of dust into the disk device.

A HDD, used in a car navigation system in a vehicle, is required to have a structure that allows the HDD to be removed for maintenance. Accordingly, an HDD device has been proposed that provides the removability function wherein the HDD unit is mounted in a case to which it is secured by a threaded fastener, which case, in turn, is slidably inserted into a bracket on a slide structure. The slide structure holds the case (the HDD unit) such that connectors of the HDD unit are connected to and disconnected from joined to and separated from) connectors on the bracket upon insertion and removal of the case, respectively. However, in this proposed device, in order to facilitate attachment and removal of the HDD holding case to and from the bracket, a tiny gap is provided between the bracket and the case. Therefore, the HDD holding case is shaken by the vibration of the bracket that results from the vibration of the vehicle. Sympathetic vibration, in particular, produces a strong G-force (acceleration) in the HDD holding case which may cause instability in the writing and reading operations of the HDD.

SUMMARY OF THE INVENTION

Accordingly, it is an object of the present invention to inhibit the propagation (transfer) of vibration to the disk unit.

To achieve the foregoing object, the present invention provides a disk device which includes a disk unit, a case, a bracket, and a guide member. The disk unit houses a disk-shaped information storage medium and the disk unit, in turn, is fixed (housed) within the case. The guide member guides relative sliding movement between the case and a bracket to allow for inserting the case into and removing the case from the bracket.

The disk device also includes a plurality of spring members having base portions fixed to one of the brackets and the case and distributed in the direction of the relative movement. Each of the spring members extends in the direction of the relative movement. Distal ends of the spring members face and press against the other of the bracket and the case, and base portions of the spring members are fixed to the one of the bracket and the case.

Because the base portions of the spring members are fixed to the one of the bracket and the case, and the tips (the free distal ends) of the spring members extend in the direction of the relative movement, even if the one of the bracket and the case vibrates, the vibration is absorbed by the spring members, and propagation (transfer) of the vibration to the other of the bracket and the case is inhibited. Only the distal ends of the spring members make contact with the other of the bracket and the case, so there is little frictional resistance to the relative movement, and the relative movement is smooth.

In a preferred embodiment of the present invention, the plurality of the spring members includes a first group, in which the distal ends of the spring members face a side panel of the other of the bracket and the case, and a second group, in which the distal ends of the spring members face a bottom or top planar surface of the other of the bracket and the case that is orthogonal to the side panels of the other of the bracket and the case.

In the above-described configuration, propagation of vibration from the bracket to the case, in the lateral direction, for example, is inhibited by the first group of the spring members. That is, a lateral vibration inhibition effect is achieved. Furthermore, propagation of vertical vibration from the bracket to the case, for example, is inhibited by the second group of the spring members. In other words, a vertical vibration inhibiting effect (feature) is also provided.

The first group of spring members, referred to above, may include a plurality that faces a first side panel of the other of the bracket and the case and a plurality that faces a second side panel opposite the first side panel. In this configuration, the spring members of the first group press against the two opposing side panels of the case in opposite directions. This further increases the lateral vibration inhibition effect.

The disk device may also include at least one small projection on each of the first side panel and the second side panel that is continuous with and is a part of (integral with) the side panel. The small projections protrude toward the spring members and are pressed against by the spring members to make reliable contact when the case is mounted in the bracket. Frictional resistance to the relative movement is also minimized, so that the relative movement is smooth.

The above-described spring members that face the first side panel, the spring members that face the second side panel, and the spring members of the second group that face the planar top or bottom panel may press against the other of the bracket and the case at a position where a plane that is orthogonal to the direction of the relative movement intersects the other of the bracket and the case. In this configuration, the spring members of the first group and the second group exert spring forces against the other of the bracket and the case at the same position in the direction of the relative movement. This makes it possible to effectively inhibit sympathetic vibration in the sheet metal from which the case is fabricated.

The disk unit may be fastened to the case at a plurality of points in a straight line that is orthogonal to the direction of the relative movement and that lies within the above-mentioned plane that is orthogonal to the direction of the relative movement. In this configuration, the spring members of the first group and the second group exert spring forces against the other of the bracket and the case at the points where the disk unit is fastened to the case. This makes it possible to effectively inhibit sympathetic vibration in the case, which is combined into a single unit with the disk unit.

In one embodiment, the guide member is on the bracket, supports the case from below and guides the relative movement. In such an embodiment, the planar surface, described above as orthogonal to the side panel of the case, may be folded rails that extend inwardly from the side panels and longitudinally in the direction of the relative movement. In this configuration, the spring members press against the rails, inhibiting vertical vibration of the case relative to the bracket. There is little resistance to the sliding by the spring members, so that the sliding is smooth.

The spring members may be blade springs that are bent such that they protrude toward the other of the bracket and the case. In this configuration, the tips (the free distal ends) of the spring members will not catch on, but will instead slide smoothly over, the small projections on the other of the bracket and the case when the case is inserted into and removed from the bracket. Thus, the case can be inserted into and removed from the bracket more smoothly.

The bracket may be formed by press punching of a metal sheet, and the spring members may be formed by press punching, leaving their base portions connected. Manufacturing the bracket by press punching is easy, and because each of the spring members is integral with the bracket, the manufacturing of the spring members is also easy. Moreover, because the bracket is made of metal, it can easily provide electrical grounding.

Forming the case by press punching of a metal sheet not only makes the manufacturing of the case easy, it also makes it possible for the case and the bracket to be electrically connected through the spring members. If the bracket is then at ground potential, the case automatically also becomes grounded. Electrically connecting a device grounding conductor of the disk unit to the case makes it possible for the disk unit to also be at the ground potential of the bracket.

DESCRIPTION OF THE PREFERRED EMBODIMENTS

Preferred embodiments of the present invention will now be described with reference to the drawings.

Embodiment 1

Figure 1:
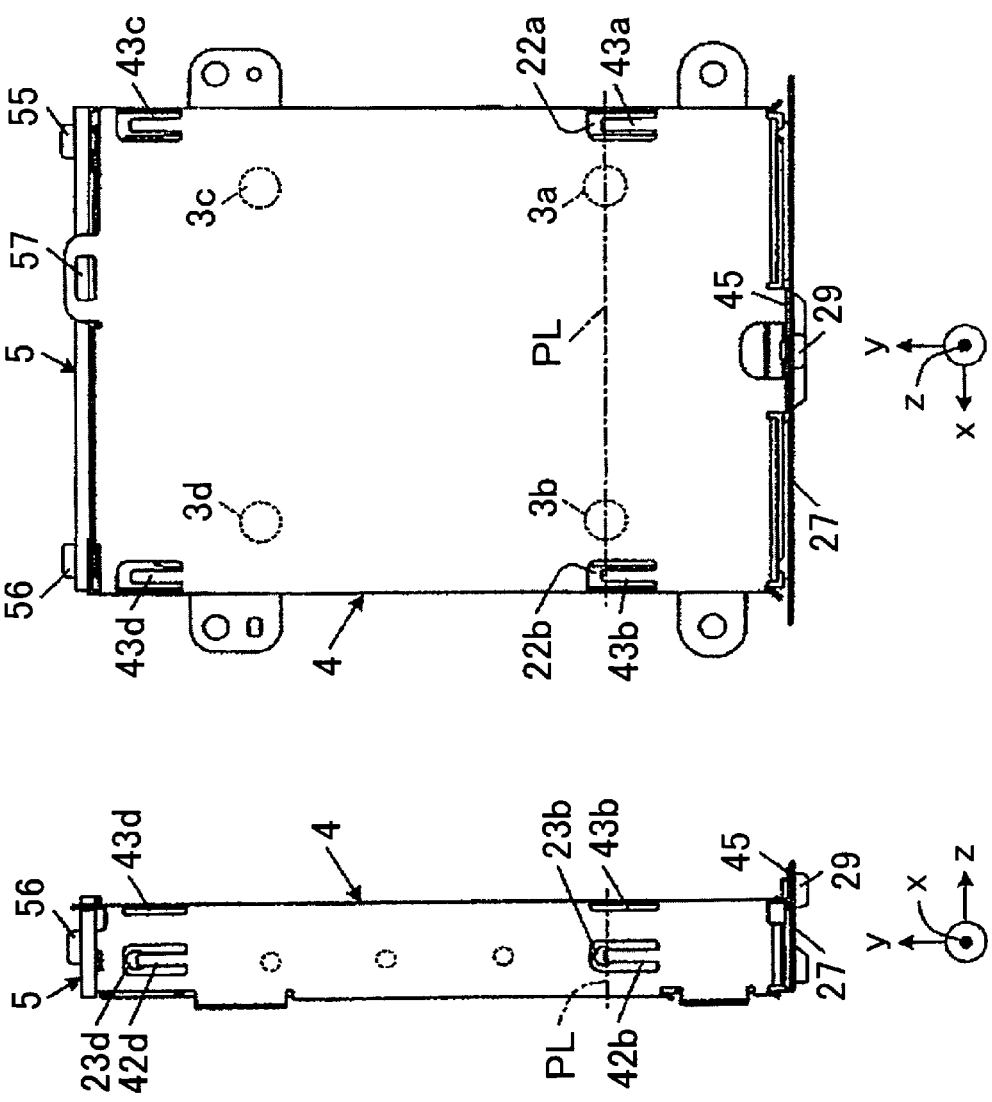
FIG. 1A is a plan view of a hard disk drive (HDD) device (apparatus) that is one embodiment of the present invention.
FIG. 1B is a left side view that shows the HDD device of FIG. 1A.
FIG. 1C is a right side view of the embodiment of FIG. 1A.

FIGS. 1A-1C show a hard disk drive (HDD) device as one embodiment of the present invention. The HDD device is installed in a vehicle and provides map information, road information, and the like to a navigation system.

Figure 2:
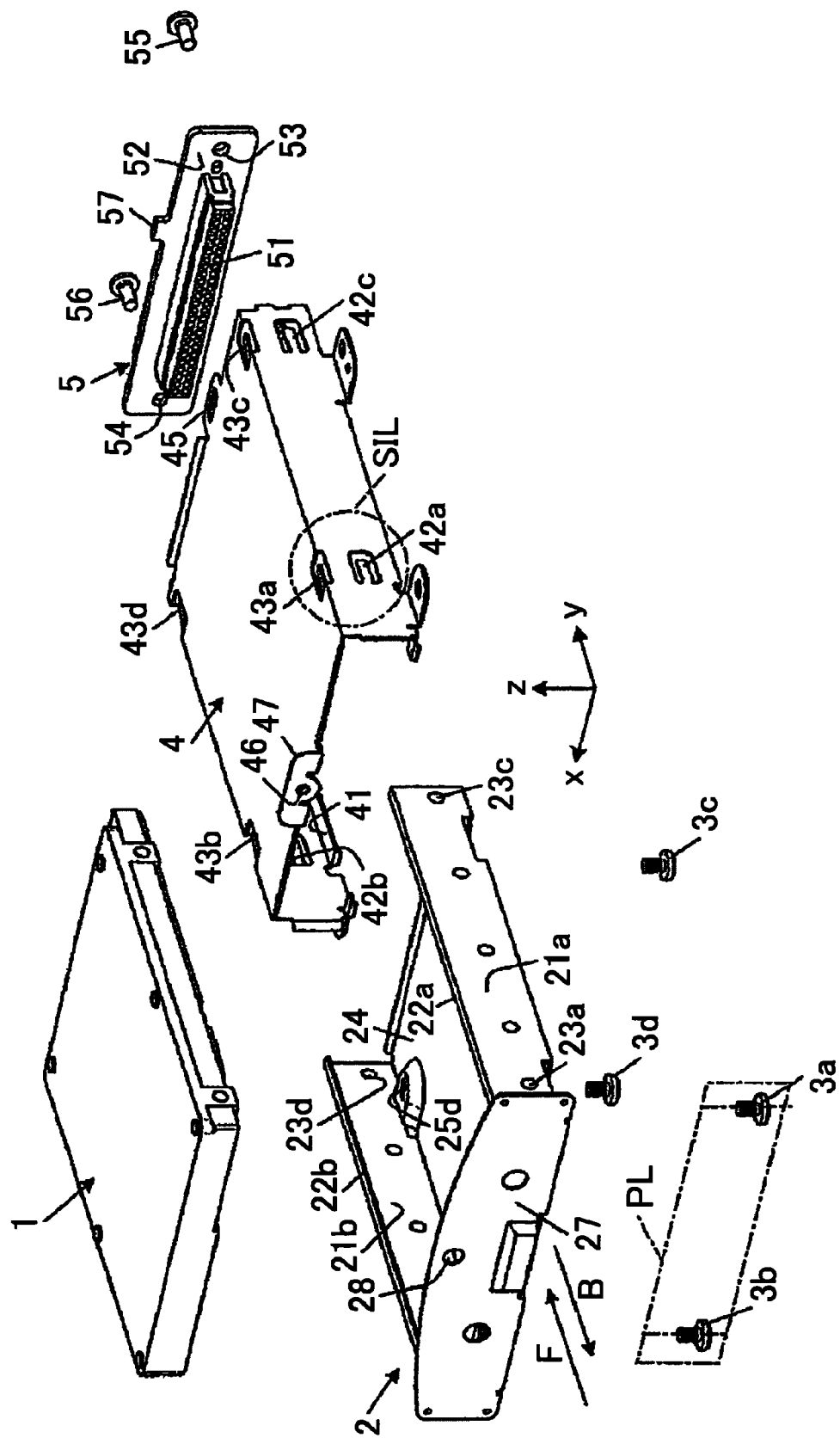
FIG. 2 is an oblique exploded view of the HDD device shown in FIG. 1A.
Figure 3:
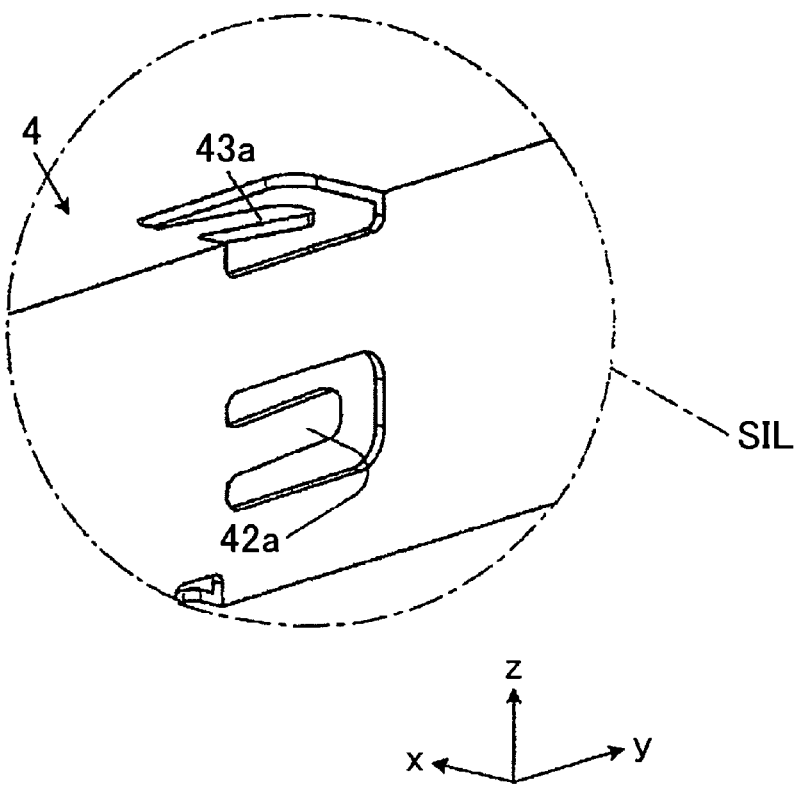
FIG. 3 is an enlarged oblique view of a portion SIL of a bracket 4 shown in FIG. 2.

An HDD unit 1 shown in FIG. 2 is a disk unit which contains a hard disk, a drive motor, a read-write head, a head actuator, and a control circuit board, as in a conventional HDD unit. A male connector (not shown in the drawings) includes a plurality of connector pins which extend in a case insertion direction F (FIG. 2) toward the rear edge of the control circuit board. When the male connector is pushed into the case in direction F, the male connector connects to a female connector 51 in a printed wiring panel 5 that is mounted on the bracket 4. A metal bottom plate (not shown in the drawings), that is electrically connected to grounding conductor of the control circuit board, is provided on the bottom face of the HDD unit 1. Four female threaded holes are provided in the bottom plate.

A case 2 is slidable relative to the bracket 4 in the insertion direction F (y) and a removal direction B, as shown in FIG. 2. The bracket 4 is positioned on and secured by a threaded fastener to a metal (electrically conductive) mounting substrate (not shown in the drawings) on the vehicle body. The bracket 4 includes a guide rail 41 which serves as a guide member for guiding the sliding movement and for supporting the case 2 from below. The bracket 4 includes another guide rail opposite the guide rail 41 in the x direction but is hidden in the perspective view of FIG. 2. The bracket 4 and the case 2 are formed from sheet metal by press punching and press bending.

The case 2 includes first and second side panels 21a, 21b that extend at right angles (upward and vertical in use) from a bottom panel 24. Upper edges of the first and second side face panels 21a, 21b are bent inward toward the interior of the case 2, forming rails 22a, 22b extending in direction F (y). A first group of five roughly conical small projections 23a, 23c and a second group of five roughly conical small projections 23b, 23d that project outwardly from the case 2 are respectively formed in the first and second side panels 21a, 21b by pressing. The first group of the small projections, which includes small projections 23a, 23c, and the second group of the small projections, which includes 23b, 23d are each five in number, and in each of the groups, the five projections are aligned in the insertion direction F. Four protrusions that project upward in the z direction are formed in the bottom panel 24 of the case 2 by pressing and a threaded through-hole 25d is provided in each of the protrusions. A face plate 27 extends at a right angle upwardly from the bottom panel 24 of the case 2, and a threaded through-hole 28 is provided in the face plate 27. The small projections 23a to 23d are not necessarily cones and, alternatively, may be, for example, four-sided pyramids, three-sided pyramids, hemispheres, cut-out quarter-spheres, press-punched tongues with one edge attached or any other shape, so long as each projection has an inclined surface which, when the case 2 is pulled outwardly from the bracket 4, makes contact with a distal end of one of four blade springs 42a, 42b, 42c, 42d in the bracket 4 (described later) such that it pushes the distal end upward.

The HDD unit 1 is inserted into the case 2 from above through the space between the rails 22a, 22b. The HDD unit is then secured within the case 2 by four screws 3a to 3d which are inserted from below, through the four respective threaded through-holes 25d in the bottom panel 24 and into four female threaded holes provided in the metal bottom plate on the bottom face of the HDD unit 1. A male connector (not shown in the drawings) of the HDD unit 1 is located on the rear face of the HDD unit 1 that is opposite the front face of the HDD unit 1 where the face plate 27 is located. When the case 2 is inserted into the bracket 4, the male connector becomes connected to the female connector 51 in the printed wiring panel 5 that is mounted on the rear of the bracket 4, extending at a right angle to the top panel of the bracket 4.

The bracket 4 has first and second side panels that respectively face the first and second side panels 21a, 21b of the case 2 from the outside. The blade springs 42a, 42c on the first side panel are formed by press punching such that a U-shaped outline is punched out leaving one end of each of the blade springs continuous with the sheet material of the bracket 4. The blade springs 42b, 42d on the second side face panel are formed in the same manner (FIG. 1B). The blade springs 42a, 42c and 42b, 42d are slightly bent toward the interior of the bracket 4 in order to strengthen the spring forces that press on the case 2. Each of the blade springs 42a, 42c and 42b, 42d extends in the insertion direction F, and the distal ends of the springs are positioned to engage the small projections 23a, 23c and 23b, 23d of the case 2 when mounted within the bracket 4 (FIGS. 1B, 1C).

Figure 4:
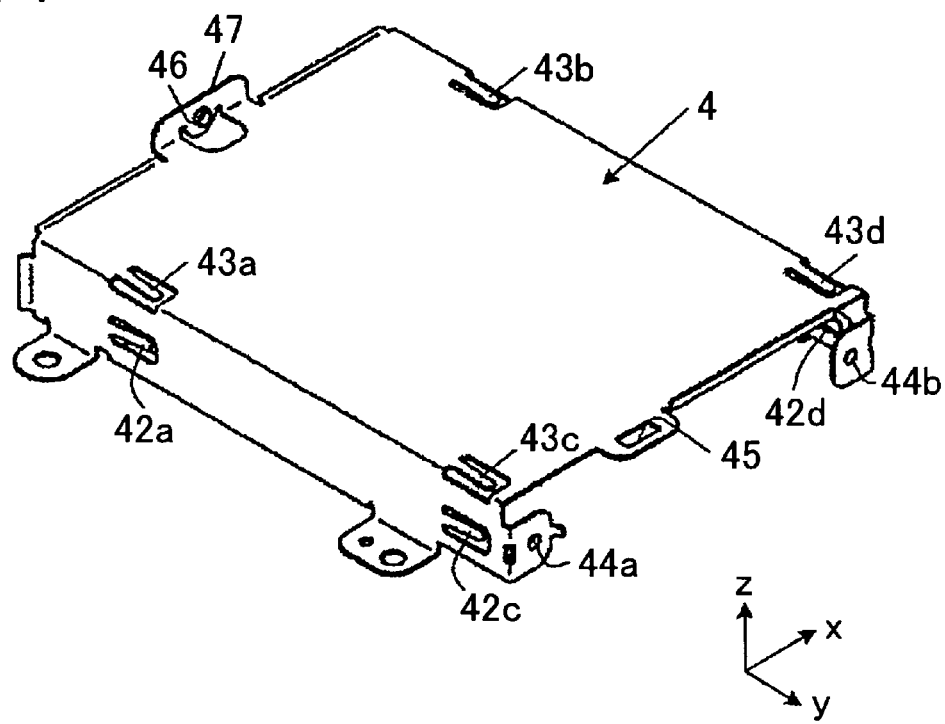
FIG. 4 is an oblique view that shows a rear edge of the bracket 4 shown in FIG. 2.

The bottom edges of the first and second side panels of the bracket 4 are bent inward, toward the interior of the bracket 4, to form the guide rail 41 and another guide rail that is opposite the guide rail 41 in the x direction. Blade springs 43a, 43c and 43b, 43d of the same type as blade springs 42a, 42c and 42b, 42d are formed in the x-y planar top panel of the bracket 4, and positioned to press against the rails 22a, 22b of the case 2. As shown in FIG. 4, a pair of printed wiring panel support pieces with threaded screw holes 44a, 44b and an opening 45, that receives a stop projection 57 on the printed wiring panel 5, are provided at the rear edge of the bracket 4. A stop piece 47 with a threaded screw hole 46 is provided at the front edge of the bracket 4, rising from the top panel at a position where the screw hole 46 aligns with the threaded through-hole 28 in the face plate 27 of the case 2 (FIGS. 2 and 4).

The front and rear faces of the printed wiring panel 5 are each provided with a grounding conductor (the reference numeral 52 denotes the device grounding conductor on the front face), and the female connector 51 is fastened to the printed wiring panel 5. An electrical cable (a flat cable) is connected to the female connector 51 on the rear face of the printed wiring panel 5, but is omitted from the drawings. In the female connector 51, a connector terminal that accepts a device grounding pin of the male connector of the HDD unit 1 is connected to a device grounding wire of the electrical cable and is also connected to the device grounding conductor 52 which is in the form of at least one face (for example, on the front face) of the printed wiring panel 5. The printed wiring panel 5 is joined to form a single unit with the bracket 4 and secured by inserting the projection 57 of the printed wiring panel 5 into the slot opening 45 of the bracket 4, bringing the device grounding conductor 52, i.e. the front face of the printed wiring panel 5, into contact with the printed wiring panel support pieces of the bracket 4 (FIG. 4), and then inserting screws 55, 56 through threaded through-holes 53, 54 in the printed wiring panel 5, and into the screw holes 44a, 44b (FIG. 4) in the printed wiring panel support pieces of the bracket 4. With the printed wiring panel 5 thus mounted on the bracket 4, the device grounding conductor 52 (front face of the printed wiring panel 5) is in direct contact with (electrically connected to) the bracket 4, and the rear face of the printed wiring panel 5 is electrically connected to the bracket 4 through the screws 55, 56.

The HDD device is assembled as shown in FIGS. 1A, 1B and 1C by mounting the printed wiring panel 5 on the printed wiring panel support pieces on the rear edge of the bracket 4, pushing the case 2, in which the HDD unit 1 is mounted, in the insertion direction F, to insert the case 2 into the opening at the front of the bracket 4 on the guide rails 41 and to connect the male connector of the HDD unit 1 to the female connector 51 of the printed wiring panel 5. A screw 29 (FIGS. 1A, 1B and 1C) is then inserted through the threaded through-hole 28 in the face plate 27 and then into the screw hole 46 in the bracket 4.

The electrical cable that is connected to the female connector 51 of the printed wiring panel 5 is omitted from FIGS. 1A, 1B and 1C. As seen in FIG. 2, in the bracket 4, the portion of the stop piece 47 below the screw hole 46 extends below the top panel of the bracket 4, so that it serves as a stopper. Therefore, during the assembly of the HDD device, if the case 2 is inverted (such that the top of the HDD unit 1 is facing downward), the case 2 cannot be inserted into the bracket 4, because the rear edge of the bottom panel 24 will catch on the lower stopper portion of the threaded stop piece 47. Thus, the stop piece 47 has a stopper function that prevents the case 2 from being mounted in the bracket 4 in an incorrect orientation (upside down).

In the HDD device shown in FIGS. 1A, 1B and 1C, the case 2 (FIG. 2), in which the HDD unit 1 (FIG. 2) is mounted, is supported from below by the guide rail 41 (FIG. 2) of the bracket 4. The tips (the free distal ends) of the blade springs 43a to 43d of the bracket 4 press downward with a spring force on the rails 22a, 22b of the case 2 and thereby press the case 2 against the guide rails of the bracket 4 (one of which is shown as 41). Thus the blade springs 43a to 43d absorb vibration that would otherwise be propagated (transferred) from the bracket 4 to the case 2 in the vertical direction z. That is, the propagation of vibration from the bracket 4 to the case 2 in the vertical direction z is inhibited.

Further, the distal ends of the blade springs 42a to 42d of the bracket 4, shown in FIGS. 1B and 1C, press with a spring force against the small projections 23a to 23d on the side panels 21a, 21b (FIG. 2) of the case 2. Thus, spring forces hold the case 2 from both the left and the right. In this manner, blade springs 42a to 42d absorb vibration that would otherwise be propagated (transferred) from the bracket 4 to the case 2 in the left-right direction x. That is, propagation of vibration in the left-right direction x is inhibited. Note that the three small (inboard) projections of the same type between the small projections 23a and 23c on the first side panel 21a (FIG. 2), as well as the corresponding three small projections of the same type on the second side panel 21b, limit the amplitude of the relative vibration between the bracket 4 and the case 2 in the left-right direction x and also prevent bumping of the case 2 laterally (in direction x) against the bracket 4 when the case 2 is slid in the directions F, B during insertion and removal, respectively.

The face plate 27 (FIGS. 1A, 1B 1C and 2) of the case 2 is separable from the side panels 21a, 21b. The face plate 27 extends vertically (at a right angle) from the bottom panel 24 and is connected by the screw 29 (FIGS. 1A, 1B and 1C) at a fairly high position, to the stop piece 47, which extends vertically upward from the bracket 4. The face plate 27 therefore readily vibrates in the insertion and removal directions F, B relative to the bottom panel 24. That is, the face plate 27 absorbs vibration that would otherwise be propagated (transferred) from the bracket 4 to the case 2 in the insertion and removal directions F, B. In other words, the propagation of vibration in the longitudinal direction y is inhibited. Furthermore, pin receiving conductors in the female connector 51 of the printed wiring panel 5 press with a spring force against the connector pins of the male connector of the HDD unit 1 that is mounted in the case 2. Thus, the vibration that would otherwise be propagated (transferred) from the bracket 4 to the case 2 in the insertion and removal directions F, B is also absorbed where the male and female connectors are connected. That is, the propagation of vibration in the longitudinal direction y is further inhibited.

Referring to FIGS. 1A, 1B, 1C and 2, near the opening at the front edge of the bracket 4, the blade spring 42a that faces the first side panel 21a, the blade spring 42b that faces the second side panel 21b, as well as the blade springs 43a, 43b that respectively face the rails 22a, 22b, press on the case 2 at positions where a plane PL (an x-z plane), that is orthogonal to the insertion direction F (y), intersects the case 2. Thus, the blade springs 42a, 43a, 43b, 42b exert spring forces against the case 2 at positions that are the same in relation to the insertion direction F (y), inhibiting sympathetic vibration near the front edge of the sheet metal of the case 2.

Near the rear edge of the bracket 4, the blade spring 42c that faces the first side panel 21a, the blade spring 42d that faces the second side panel 21b, as well as the blade springs 43c, 43d that respectively face the rails 22a, 22b, press on the case 2 at positions where an x-z plane, that is orthogonal to the insertion direction F (y), intersects the case 2. Thus the blade springs 42c, 43c, 43d, 42d exert spring forces against the case 2 at positions that are the same in relation to the insertion direction F (y), inhibiting sympathetic vibration near the rear edge of the sheet metal of the case 2.

Because the blade springs 42a, 43a, 43b, 42b press against the case 2 near the front edge, at the position where the straight lateral line, defined by the alignment of the screws 3a, 3b that secure the HDD unit 1 to the case 2, and where the plane PL intersects the case 2, the effect of inhibiting the sympathetic vibration in the case 2, which is combined into a single unit with the HDD unit 1, is particularly strong at that location.

When the HDD device shown in FIGS. 1A-1C is installed in a vehicle and connected to a navigation system, the device grounding conductor of the control circuit board inside the HDD unit 1, that is mounted in the case 2, is electrically connected, through the device grounding pin of the male connector of the HDD unit 1 and the terminal that accepts the pin in the female connector 51, to the grounding wire of the electrical cable that is connected to the female connector 51. Through that grounding wire, the device grounding conductor is electrically connected to a common grounding conductor of the vehicle. The terminal that accepts the device grounding pin in the female connector 51 is also connected to the device grounding conductors on the front and rear faces of the printed wiring panel 5 (the front face 52 serves as a device grounding conductor). The device grounding conductors are electrically connected to the bracket 4 and a portion of the device grounding conductors is electrically connected to the bracket 4 through the screws 55, 56. The bracket 4 is also electrically connected to the common ground of the vehicle through threaded fasteners in a metal plate, not shown in the drawings, that is at the common ground potential of the vehicle. The device grounding conductor of the control circuit board inside the HDD unit 1 is also electrically connected to the metal bottom plate of the HDD unit 1. The (bottom panel 24 of the) case 2 is electrically connected to the bottom plate through the screws 3a to 3d. By the contact between the small projections 23a to 23d of the case 2 and the blade springs 42a to 42d, by the contact of the case 2 with the guide rail 41 of the bracket 4, by the contact of the blade springs 43a to 43d with the rails 22a, 22b of the case 2, and by the electrical connection between the face plate 27 and the threaded stop piece 47 by the screw 29, the case 2 is electrically connected to the common grounding conductor of the vehicle through the bracket 4.

Because of the large number of electrical grounding routes from the HDD unit 1 to the common grounding conductor of the vehicle, the resistance of the contact between the device grounding conductor of the HDD unit 1 and the common grounding conductor of the vehicle is low, the electromagnetic interference (EMI) from the HDD unit 1 is reduced. Because of the high reliability and high stability of the spring-loaded mechanical contacts (electrical connections) between the blade springs 42a to 42d and the small projections 23a to 23d, and between the blade springs 43a to 43d and the rails 22a, 22b, the EMI that is generated by the HDD unit 1 is absorbed and reduced. Reliable and stable electrical noise reduction is thereby provided.

Figure 5:
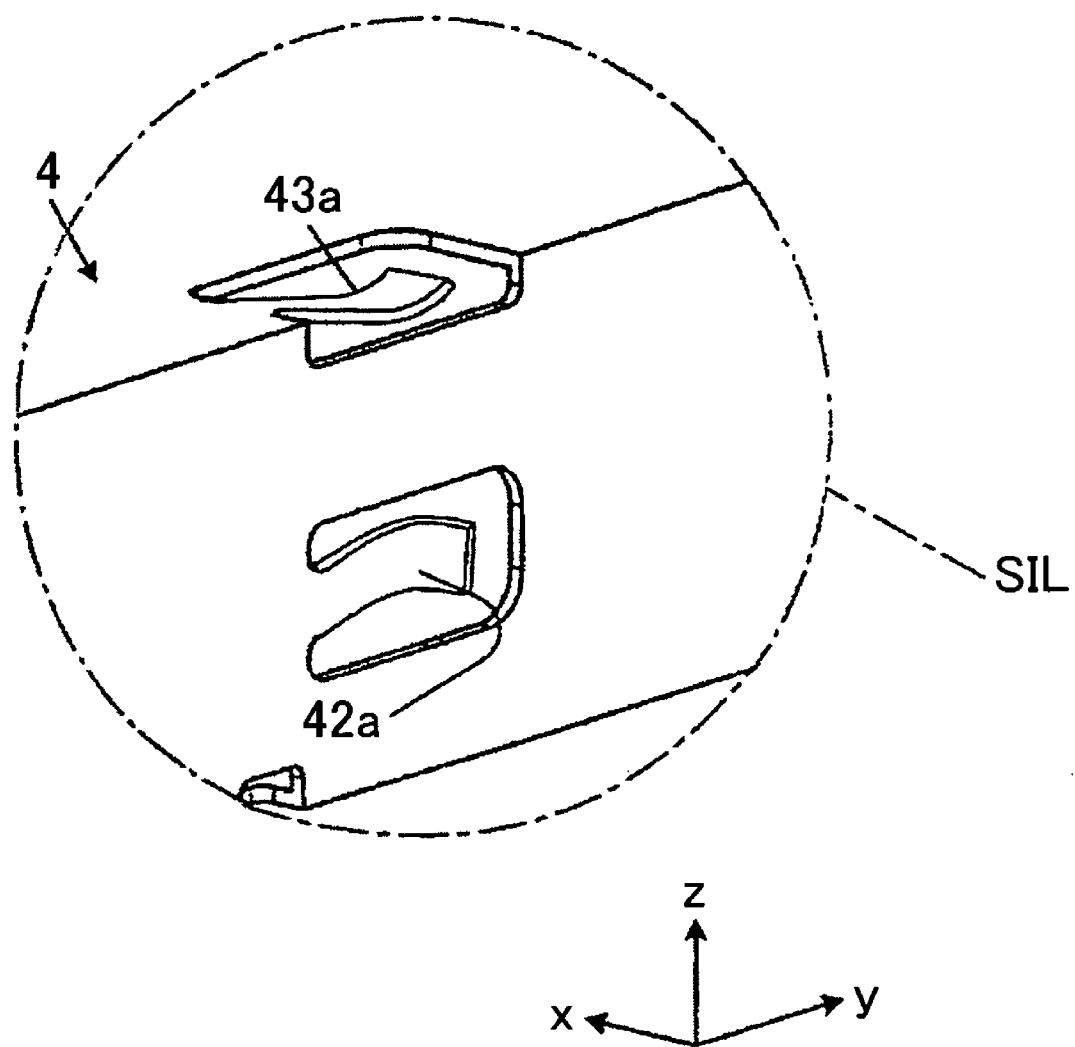
FIG. 5 is an enlarged oblique view that corresponds to FIG. 3 and shows a modification of the HDD device of FIGS. 1A-4 as another embodiment of the invention.

The blade springs 42a to 42d and 43a to 43d, as shown in FIG. 5, for example, are bent to protrude toward the case 2. Alternatively, the blade springs may be bent into V shapes or curved shapes such that the apexes of the V shapes or the curved shapes protrude toward the case 2. If the blade springs are thus bent, the tips (the free distal ends) of the blade springs will not catch on, but will instead slide smoothly over, the small projections 23a to 23d of the case 2 when the case 2 is inserted into the bracket 4 in the insertion direction F and when the case 2 is removed from the bracket 4 in the removal direction B. Thus, the case 2 can be smoothly inserted into and removed from the bracket 4.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A disk device, comprising:
   a disk unit that houses a disk-shaped information storage medium;
   a case that holds the disk unit;
   a bracket;
   a guide member that guides movement of the case relative to the bracket in inserting the case into and removing the case from the bracket; and
   a plurality of spring members that are provided on at least one of the bracket and the case, distributed in the direction of the relative movement, the spring members extending, in the direction of the relative movement, from base ends fixed to the one of the bracket and the case to free distal ends, the distal ends of the spring members facing and pressing against the other of the bracket and the case; and
   wherein the plurality of the spring members includes a first group, in which the distal ends of the spring members face a side panel of the other of the bracket and the case, and a second group, in which the distal ends of the spring members face a planar surface of the other of the bracket and the case that is orthogonal to the side panel of the other of the bracket and the case;

wherein the first group includes a plurality of the spring members that face a first side panel of the other of the bracket and the case and a plurality of the spring members that face a second side panel that is on an opposite side of the planar surface from the first side panel; and wherein the disk device further comprises a projection on each of the first side panel and the second side panel, integral with the respective side panels and protruding toward and pressing against respective spring members when the case is mounted in the bracket.

2. The disk device according to claim 1, wherein:
the spring members that face the first side panel, the spring members that face the second side panel, and the spring members of the second group that face the planar surface press against the other of the bracket and the case at a position where a plane that is orthogonal to the direction of the relative movement intersects the other of the bracket and the case.

3. The disk device according to claim 2, wherein:
the disk unit is fastened to the case at a plurality of points in a straight line extending in a lateral direction that is orthogonal to the direction of the relative movement, and
the plane includes the straight line.

4. A disk device, comprising:
a disk unit that houses a disk-shaped information storage medium;
a case that holds the disk unit;
a bracket;
a guide member that guides movement of the case relative to the bracket in inserting the case into and removing the case from the bracket; and
a plurality of spring members that are provided on at least one of the bracket and the case, distributed in the direction of the relative movement, the spring members extending, in the direction of the relative movement, from base ends fixed to the one of the bracket and the case to free distal ends, the distal ends of the spring members facing and pressing against the other of the bracket and the case; and
wherein the plurality of the spring members includes a first group, in which the distal ends of the spring members face a side panel of the other of the bracket and the case, and a second group, in which the distal ends of the spring members face a planar surface of the other of the bracket and the case that is orthogonal to the side panel of the other of the bracket and the case; and wherein:
the one of the bracket and the case is the bracket,
the other of the bracket and the case is the case,
the guide member supports the case from below and guides the relative movement, and
the planar face that is orthogonal to the side panel of the case is a folded rail that extends folded from the side panel and that extends in the direction of the relative movement.

5. The disk device according to claim 1, wherein:
the spring members are blade springs that are bent to protrude toward the other of the bracket and the case.

6. The disk device according to claim 1, wherein:
the bracket is formed by press punching of a metal sheet, and
the spring members are formed by press punching around their sides and distal ends, while leaving their base ends attached to the metal sheet.

7. The disk device according to claim 6, wherein:
the case is formed by press punching of a metal sheet.

8. The disk device according to claim 4, wherein:
the bracket is formed by press punching of a metal sheet, and
the spring members are formed by press punching around their sides and distal ends, while leaving their base ends attached to the metal sheet.

9. The disk device according to claim 8, wherein:
the case is formed by press punching of a metal sheet.

10. The disk device according to claim 1, wherein:
the bracket is formed by press punching of a metal sheet, and
the spring members are formed by press punching around their sides and distal ends, while leaving their base ends attached to the metal sheet.

11. The disk device according to claim 10, wherein:
the case is formed by press punching of a metal sheet.

12. The disk device according to claim 1, wherein: the bracket is formed by press punching of a metal sheet, and the spring members are formed by press punching around their sides and distal ends, while leaving their base ends attached to the metal sheet.

13. The disk device according to claim 12, wherein:
the case is formed by press punching of a metal sheet.

14. The disk device according to claim 2, wherein:
the bracket is formed by press punching of a metal sheet, and
the spring members are formed by press punching around their skies and distal ends, while leaving their base ends attached to the metal sheet.

15. The disk device according to claim 14, wherein:
the case is formed by press punching of a metal sheet.

16. The disk device according to claim 3, wherein:
the bracket is formed by press punching of a metal sheet, and
the spring members are formed by press punching around their sides and distal ends, while leaving their base ends attached to the metal sheet.

17. The disk device according to claim 16, wherein:
the case is formed by press punching of a metal sheet.

* * * * *